US012791467B2

(12) United States Patent
Shahnovsky et al.

(10) Patent No.: US 12,791,467 B2
(45) Date of Patent: Nov. 10, 2026

(54) HIGH-PRESSURE ON-LINE OXYGEN MEASUREMENT SENSOR WITH INTEGRATED FLAMEPROOF HOUSING

(71) Applicant: Modcon Systems Ltd., London (GB)

(72) Inventors: Gregory Shahnovsky, Haifa (IL); Ariel Kigel, Haifa (IL); Aleksandr Shats, Kiryat Ono (IL)

(73) Assignee: Modcon Systems Ltd., London (GB)

( * ) Notice: Subject to any disclaimer, the term of this patent is extended or adjusted under 35 U.S.C. 154(b) by 166 days.

(21) Appl. No.: 18/900,776

(22) Filed: Sep. 29, 2024

(65) Prior Publication Data

US 2026/0092863 A1 Apr. 2, 2026

(51) Int. Cl.
*G01N 21/27* (2006.01)
*G01N 21/25* (2006.01)
*G01N 21/85* (2006.01)

(52) U.S. Cl.
CPC ........... *G01N 21/27* (2013.01); *G01N 21/255* (2013.01); *G01N 2021/8578* (2013.01)

(58) Field of Classification Search
CPC ................. G01N 21/255; G01N 21/27; G01N 2021/8578
See application file for complete search history.

(56) References Cited

U.S. PATENT DOCUMENTS 6,219,566 B1 * 4/2001 Weersink ............. A61B 5/0071 600/317
2016/0091367 A1 * 3/2016 Micheels ................ G01J 3/024 250/458.1

* cited by examiner

*Primary Examiner* — Kevin K Pyo
(74) *Attorney, Agent, or Firm* — Robert Brownstein

(57) ABSTRACT

The invention is a high-pressure, on-line, oxygen measurement sensor using luminescence quenching to accurately measure oxygen concentrations in a pipeline carrying gases under pressure.

7 Claims, 7 Drawing Sheets

HIGH-PRESSURE ON-LINE OXYGEN MEASUREMENT SENSOR WITH INTEGRATED FLAMEPROOF HOUSING

TECHNICAL FIELD

The invention relates to the field of oxygen measurement in pressurized gas and liquid streams.

BACKGROUND OF INVENTION

Luminescence quenching using a specially-designed sensor dye immobilized on a support foil is a well-known and widely used method for measuring oxygen content in gas and liquid samples.

This method typically involves stimulating the sensor spot with red light, with the resulting luminescence being measured in the near-infrared (NIR) range of the electromagnetic spectrum.

Current implementations of this technology are limited to low-pressure sample measurements, necessitating the extraction, handling, and subsequent release of the sample to the atmosphere. Such processes are not only cumbersome but also present significant safety and environmental risks, particularly when dealing with volatile substances.

Existing oxygen measurement technologies also require sample pressure reduction, thereby precluding their use in on-line analysis of high-pressure gas streams, such as hydrogen, hydrocarbons, and other industrial gases.

BRIEF DESCRIPTION OF INVENTION

The invention overcomes the limitations of existing oxygen-measurement technologies by providing a robust, high-pressure sensor system capable of direct on-line analysis of oxygen content in hazardous environments.

The invention comprises a sensor housing constructed from corrosion-resistant materials that enables compatibility with a wide range of industrial gases and liquids.

A key innovation of this design is the incorporation of a sapphire window with an engineered flamepath. This window enables the sensor to be directly installed within high-pressure process streams while meeting stringent safety requirements, such as those that comply with Atmosphere EXplosible (ATEX) and International Electrotechnical Commission Explosive Atmospheres(IECEx) standards for Zone 1 hazardous areas, a place where an explosive atmosphere is likely to occur during normal operation. The atmosphere can be a mixture of air and flammable substances in the form of gas, vapor or mist.

The flamepath is designed to prevent the propagation of flames in the event of an internal explosion, thereby ensuring the safe operation of the sensor in explosive atmospheres. A flame path is design feature in a flameproof enclosure that prevents flames from escaping and allows hot gases to vent safely to the outside in the event of an explosion.

The sensor foil is designed for relatively long life by avoiding the usual adhesive attachment to a window and instead incorporates the sensor into a solid-state, rigid, structure that fits securely in an aperture in the sensor housing.

DETAILED DESCRIPTION OF INVENTION

Figure 1:
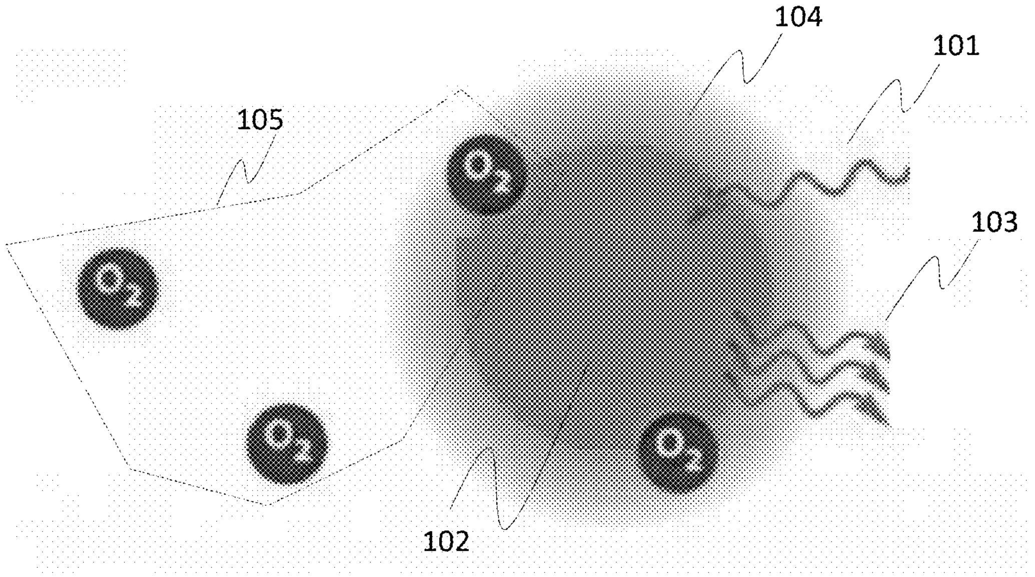
FIG. 1 illustrates exemplary luminosity under low oxygen concentration where luminescent quenching is minimal.

Industrial gas production systems, including those for hydrogen and oxygen, often use equipment suitable for both non-hazardous and hazardous locations. A common method to reduce installation costs is using general-purpose equipment, which is viable if the risk of gas leaks is effectively managed. However, this can complicate sampling gas from high-pressure pipelines for accurate oxygen analysis.

Traditional oxygen analysis technologies, such as paramagnetic, zirconia, coulometric, and tunable diode laser (TDL) systems are not equipped to handle high gas pressures directly and typically require gas sample extraction and conditioning for analysis.

Existing oxygen measurement technologies also require sample pressure reduction, precluding their use in on-line analysis of high-pressure gas streams, such as hydrogen, hydrocarbons, and other industrial gases.

The invention herein disclosed overcomes the limitations of existing oxygen measurement technologies by introducing a robust, high-pressure sensor system capable of direct on-line analysis of oxygen content in hazardous environments. It is a high-pressure, on-line, oxygen measurement sensor that utilizes luminescent quenching but does so while immersed in high-pressure gases flowing through an active pipeline.

The oxygen measurement sensor system is housed in a corrosion-resistant housing. On one end is a threaded fitting operative to securely interface the housing with a hot-tap fitting on a pipeline. On the other end is a threaded interface for a cable gland that allow a cable from the optical-electronic subsystem to exit the housing and convey supply voltage and analog/digital communication signals to and from the sensor.

The internal compartment houses the optical-electronic subsystem and keeps it insulated from the pipeline's environment. That subsystem comprises a red-light excitation source and returning emissions luminosity sensor. It is a key to combining luminescence quenching oxygen sensing in a high-pressure pipeline environment. The sensor-foil is robust and held in place but is immersed in the pipeline environment.

The excitation red light beam traverses the internal compartment, exits the sapphire window, and hits a spot on the sensor spot. The emission it stimulates returns through the sapphire window and enters the luminosity sensor inside the optical-electronic subsystem. The luminosity level is converted to an electrical signal, then processed by a microcontroller, and a digital equivalent is conveyed over a cable to another system for analysis.

If the pipeline is used to transport hydrogen, there is a safe level of oxygen that may be mixed with the hydrogen. The invention is meant to monitor that oxygen level. When the oxygen is sparsely distributed, the emission back to the luminosity sensor will be relatively high. As the oxygen concentration increases, it will cause greater luminescence quenching thereby reducing the emission beam's luminosity.

Variables, such as pressure level and temperature, will affect the oxygen concentration, so the output from the optical-electronic subsystem must be factored by pressure and temperature levels. Changes in pressure and temperature will affect the accuracy of oxygen concentration measurements.

An additional positive result of operating under high-pressure is that it can lower the minimum level of measured concentration by increasing that concentration to a measurable level which is later adjusted for pressure. For example, at ambient pressure, the lower-limit is about 100 ppm. However, in high-pressure applications, the analyzer can achieve a much lower limit of 2-5 ppm. The invention can operate at bar gauge pressure levels up to 200 Barg and at temperatures up to 70 degrees C.

In other luminescence quenching cases, the sensing foil is adhered to the window and typically needs frequent replacement. Here, the sensing foil is not attached by adhesive but is held rigidly in place in the hot-tap interface's aperture due to its size and rigidity. It abuts the sapphire window's external-facing face but is not adhesively coupled to it. It can be replaced, when needed, by removing the old sensor-foil structure and inserting a new one. It typically lasts orders of magnitude longer than adhesively-affixed sensor foils.

Because the sensor may be used in a Zone 1 hazardous environment, it has an engineered flamepath that contains any flame produced while safely allowing any gases to vent. The housing and flamepath meet all ATEX and IECEx standards requirements for safe Zone 1 use.

The following diagrams and descriptions are meant to be exemplary and should not be read as limiting the scope of claims.

Figure 2:
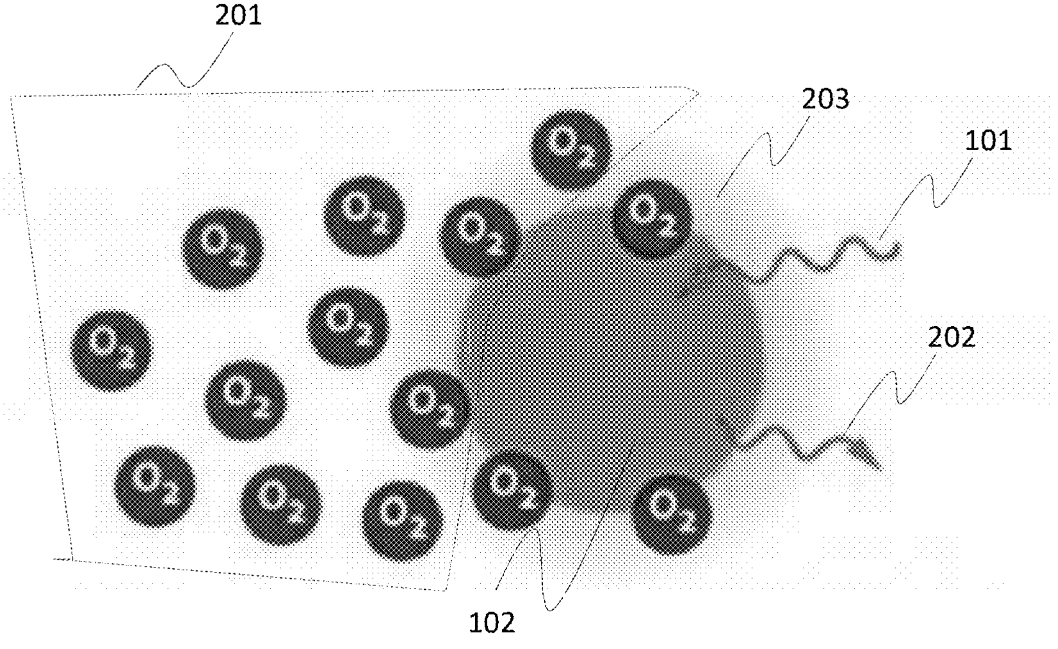
FIG. 2 illustrates exemplary luminosity under high oxygen concentration where luminescent quenching is increased from that of FIG. 1 and luminosity is diminished.

Luminescent quenching is shown in FIGS. 1 and 2. In FIG. 1, the sensor (102) is excited by a red-light beam (101) and resulting emission beams (103) of near-infrared (NIR) wavelengths will have a luminosity (104) that is directly related to oxygen molecule concentration (105).

In FIG. 2, the incident red beam (101 from FIG. 1) exciting the sensor (102) produces fewer emission beams (202) thus having lower luminosity (203) because of higher oxygen molecule concentration (201). The luminescence quenching increases with oxygen concentration increases.

Figure 3:
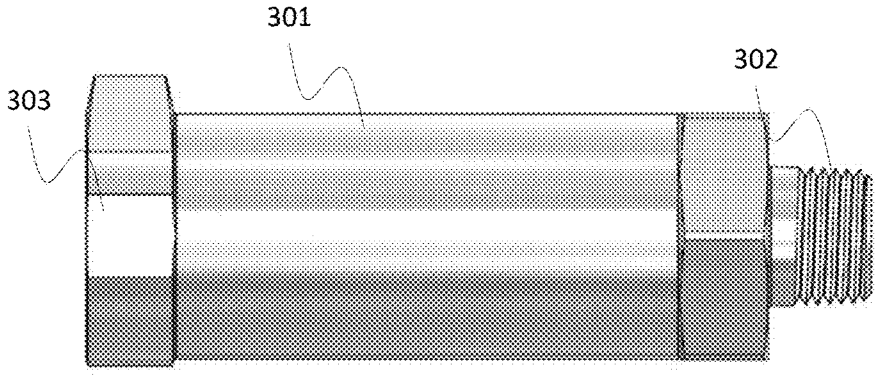
FIG. 3 shows an exemplary view of the sensor housing of an embodiment.

FIG. 3 shows the exterior of the sensor housing (301) with one end tailored for interface with a hot-tap structure on a pipeline, and the opposite end tailored for a tightly sealed cable to pass from the internal compartment to an adjunct analyzer system.

Figure 4:
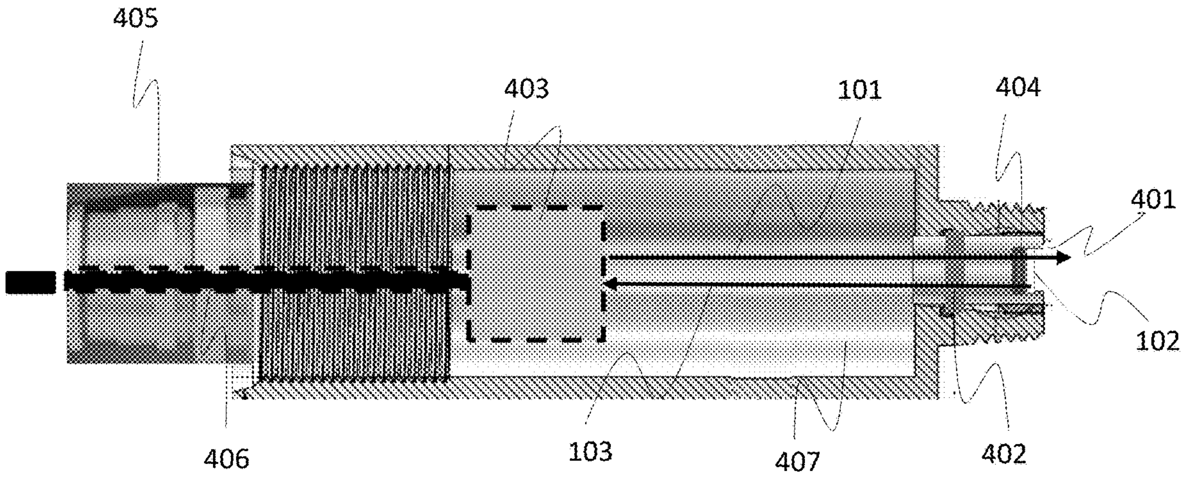
FIG. 4 illustrates a cut-away view, exposing the inner structures of the sensor housing and their juxtapositions.

In FIG. 4, a cut-away view shows the interior of the sensor housing where an aperture structure on the one end (401) is operative to hold the sensor-foil structure (102) rigidly in place against the sapphire window's (404) external-facing face. The optical-electronic subsystem (403), contained in the internal compartment (407) is operative to permit its internal red-light source to emit a red beam (101) and receive a resulting emission beam (103). The processed emission beam's luminosity level evokes an output signal conveyed over cable (406), through adapter (405) to an adjunct analyzer. A flamepath (402) is operative to contain any flame that may be produced and allow safe venting of any gases, making it safe to use in a Zone 1 hazardous environment.

Figure 5:
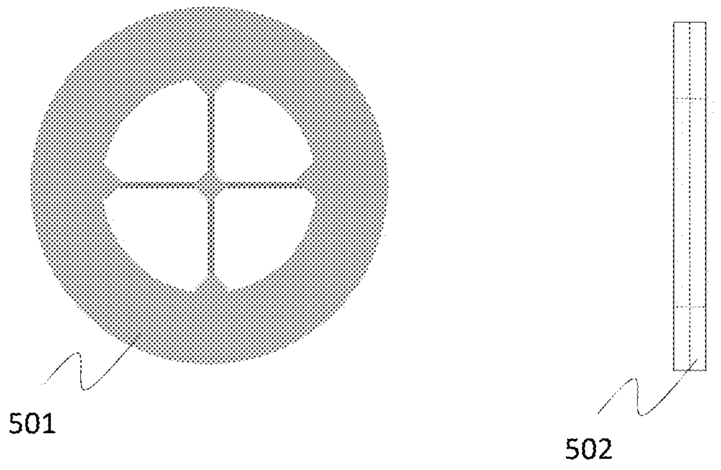
FIG. 5 shows an exemplary view of an embodiment of a solid-state sensor imbued with sensor dye which remains immobile despite the presence of high-pressure gases impinging upon it.

FIG. 5 shows a front view of the sensor (501) and a side view (502).

Figure 6:
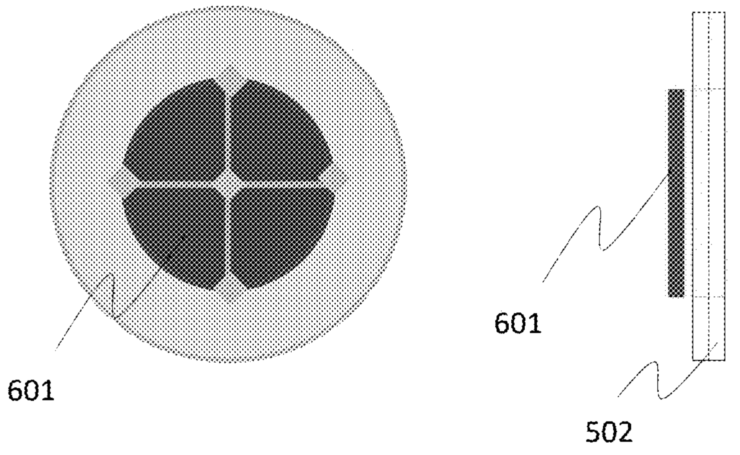
FIG. 6 illustrates the juxtaposition of the sensor of FIG. 5 and the sapphire window that prevents high-pressure gases to enter the housing while allowing red light excitation of the sensor and return emission from the sensor to pass from outside to inside the sensor housing.

In FIG. 6, the sensor is adjacent to the external face of the sapphire window (601). A side view shows the juxtapositions of the window and sensor. The sensor and external-facing face of the sapphire window are exposed to a pipelines environment.

Figure 7:
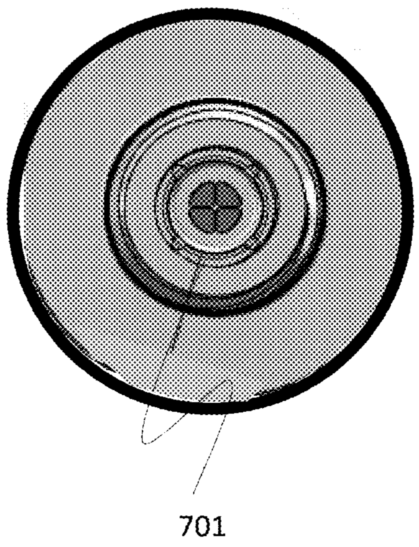
FIG. 7 shows an end-on view of the sensor and sapphire window from outside the sensor housing.

FIG. 7 shows an end-on view of the hot-tap interface end of the housing showing the sensor and sapphire window in-situ.

Figure 8:
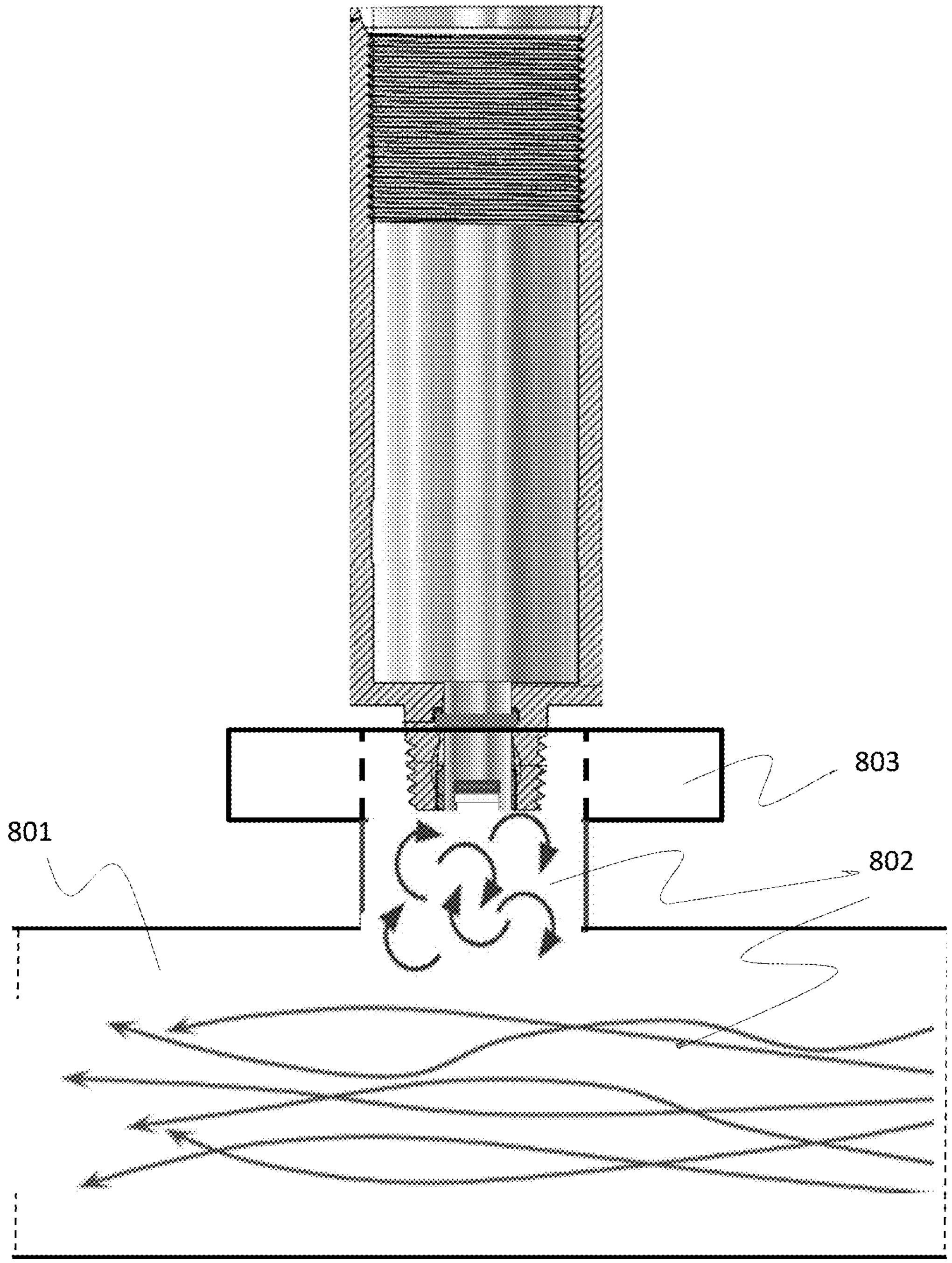
FIG. 8 shows the sensor housing interface with a hot-tap fitting attached to a pipeline through which high-pressure gas is flowing.

In FIG. 8, the sensor housing is positioned such that the hot-tap interface end is securely interfaced with the hot-tap (803). As such, the sensor and external-facing face of the sapphire window are exposed to the pressurized gas flowing through the pipeline (801 and 802).

Figure 9:
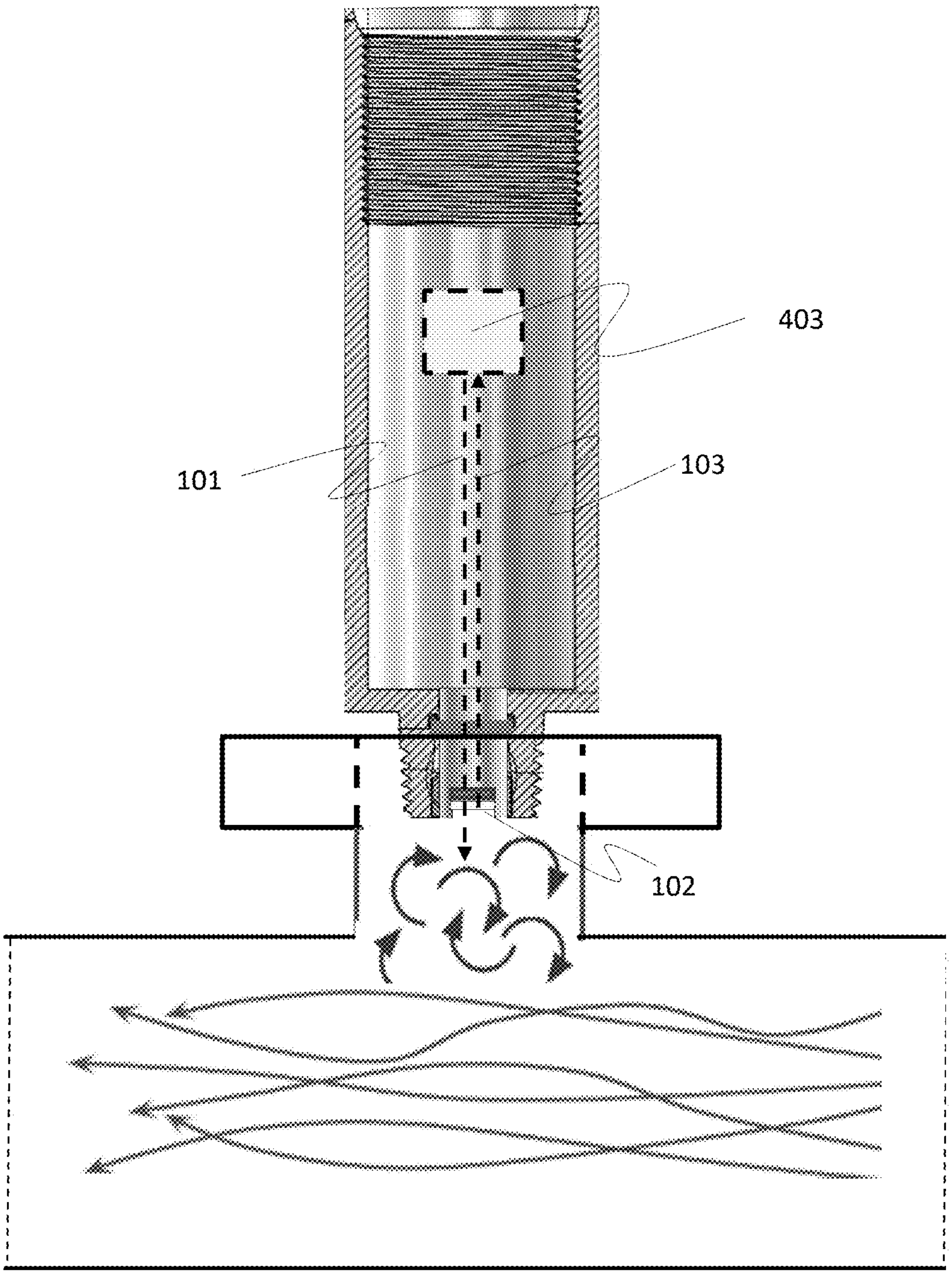
FIG. 9 shows how the installed sensor housing enables excitation and emission light to pass from inside to the sensor, and from the sensor to the inside of the housing.

In FIG. 9, the red excitation beam (101) emerges from the optical-electronic subsystem (403) and passes through the sapphire window where it strikes sensor (102) which emits a near-infrared emission beam that passes through the sapphire window and enters the optical-electronic subsystem (403).

Figure 10:
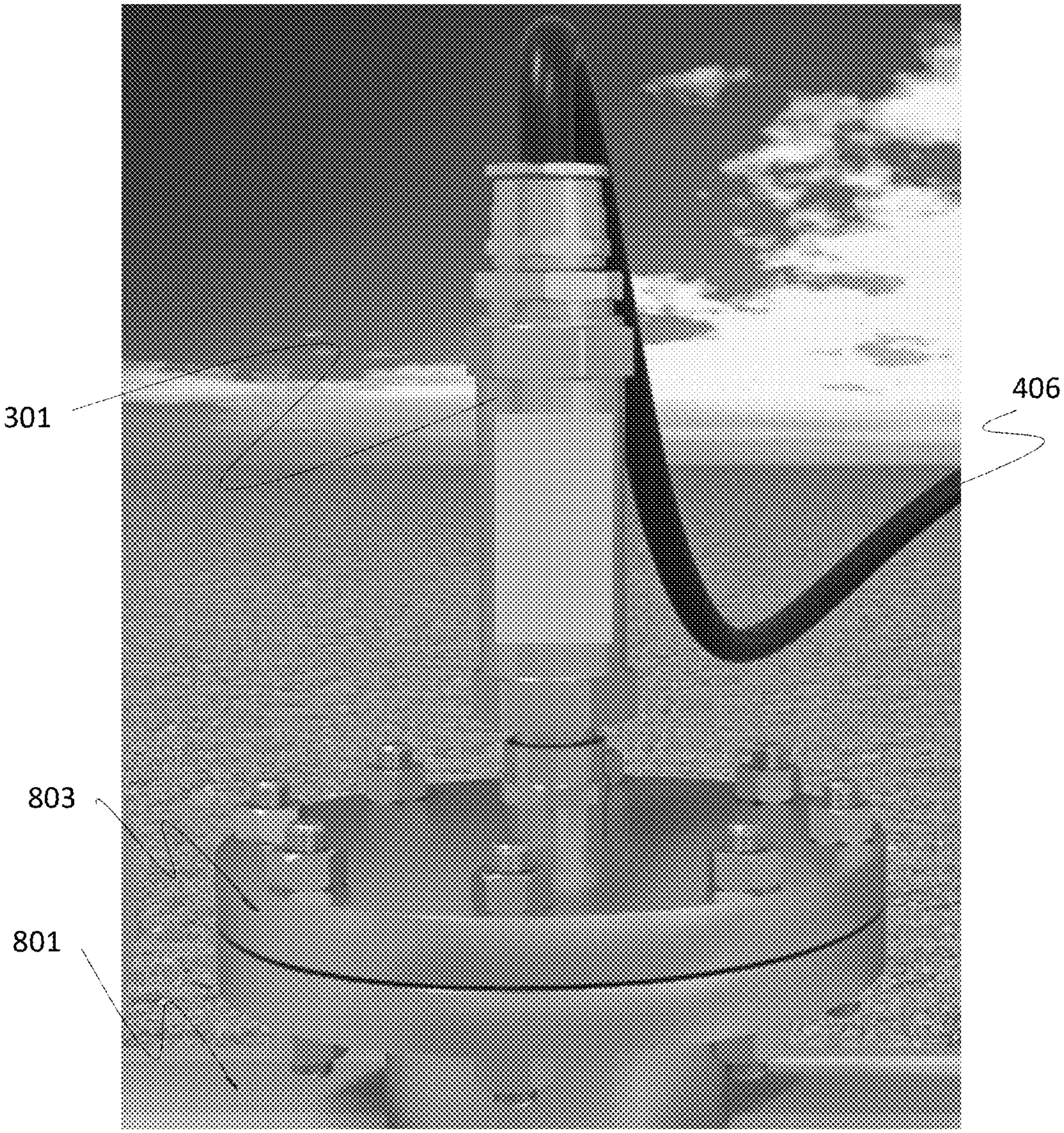
FIG. 10 shows a realistic view of an attached sensor, the service to which it is attached, and the pipeline to which the sensor is attached.

FIG. 10 shows a realistic view of the sensor housing (301) interfaced to the hot-tap structure (803) which enables the sensor to be immersed in the pipeline's (801) gaseous environment while under pressure and provides a sealed interface on the opposite end for the cable (406) conveying control signals and luminosity-level signals to and from the sensor system.

The figures are not drawn to scale and are meant to be exemplary. Any means for rigidly and securely affixing the sensor-foil structure to the housings hot-tap interface's aperture is allowed. The output of the optical-electronic subsystem, conveyed over the cable, to an adjunct analyzer will have a format compatible with that analyzer.

What is claimed is:

1. A high-pressure, on-line, oxygen measurement sensor comprising:

a corrosion-resistant housing;

at one end of the corrosion-resistant housing is a hot-tap connection;

at an opposite end of the corrosion-resistant housing is a threaded cylindrical opening operative to accommodate a cable gland;

a hermetically-sealed internal compartment within the corrosion-resistant housing;

a sapphire window at the one end permitting light passage while sealing the corrosion-resistant housing from process-stream high pressure;

a sensor comprising:

a circular support-foil structure operative to couple securely to the one end's inner circumference and resting against the sapphire window's external-facing face;

the circular support structure suffused with sensor dye;
the sensor dye operative to initiate luminescent quenching in the presence of oxygen molecules;
an optical-electronic subsystem comprising:
a red-light excitation source;
a luminosity sensor; and
a programmed microcontroller.

2. A claim as in claim 1 wherein:
the corrosion-resistant housing is made of SS316 Cr—Ni—Mo stainless steel.

3. A claim as in claim 1 wherein:
the corrosion-resistant housing is made of Titanium.

4. A claim as in claim 1 wherein:
the one end's hot-tap connection is compatible with National Pipe Taper ½-inch thread.

5. A claim as in claim 1 wherein:
the opposite end is threaded and compatible with 32-mm non-tapered thread.

6. A claim as in claim 1 wherein:
The hermetically-sealed internal compartment contains the optical-electronic subsystem.

7. A method comprising:
emitting a red light beam through a sapphire window so as to excite sensor dye on a sensor foil structure securely held in place by a corrosion-resistant housing fixture;
receiving light emission beams from the sensor dye by a luminosity sensor, inside an internal compartment in the corrosion-resistant housing structure, operative to produce electrical signals that vary predictably with luminosity levels;
conveying the electrical signals to a microcontroller programmed to produce electrical current outputs representing the luminosity values; and
conveying the electrical current outputs, conductively, to an adjunct analyzer system.

* * * * *